United States Patent [19]

Endo

[11] Patent Number: 5,775,118
[45] Date of Patent: Jul. 7, 1998

[54] AIR CONDITIONING APPARATUS FOR VEHICLE

[75] Inventor: Yoshiharu Endo, Nagoya, Japan

[73] Assignee: Denso Corporation, Kariya, Japan

[21] Appl. No.: 846,846

[22] Filed: May 1, 1997

[30] Foreign Application Priority Data

May 8, 1996 [JP] Japan ................... 8-113967

[51] Int. Cl.$^6$ .................................................. F25B 41/04
[52] U.S. Cl. ...................................... 62/225; 62/296
[58] Field of Search ......................... 62/225, 244, 296

[56] References Cited

U.S. PATENT DOCUMENTS 5,555,739  9/1996  Kujirai et al. ........................ 62/244

FOREIGN PATENT DOCUMENTS

A-55-127216  10/1988  Japan.
U-3-24414     3/1991   Japan.
A-5-278455   10/1993   Japan.
Y2-7-37934    8/1995   Japan.

Primary Examiner—William E. Tapoical
Attorney, Agent, or Firm—Harness, Dickey & Pierece, P.L.C.

[57] ABSTRACT

A noise-absorbing member is attached on a surface of a dashboard at a passenger compartment side of a vehicle. A diaphragm case member of a temperature sensitive element portion of an expansion valve is disposed near the noise-absorbing member to face the noise-absorbing member. Thus, when noise due to a vibration of a valve body of a valve body mechanism portion of the expansion valve is transmitted to a diaphragm for operating the valve body and is further transmitted to the diaphragm case member, the noise transmitted from the diaphragm case member can be effectively reduced by the noise-absorbing member.

10 Claims, 2 Drawing Sheets

AIR CONDITIONING APPARATUS FOR VEHICLE

CROSS-REFERENCE TO RELATED APPLICATION

This application is related to and claims priority from Japanese Patent Application No. H8-113967, filed on May 8, 1996, the contents of which are hereby incorporated by reference.

BACKGROUND OF THE INVENTION

1. Field of the Invention

The present invention relates to an air conditioning apparatus for a vehicle, and particularly, to an expansion valve disposed to have a sufficient noise-absorbing effect for reducing a noise of refrigerant passing through the expansion valve of a refrigerating cycle.

2. Description of Related Art

Conventionally, in an air conditioning apparatus for a vehicle, an expansion valve of a refrigerating cycle is generally disposed in an engine compartment or a passenger compartment.

When the expansion valve is installed in the engine compartment, the expansion valve is directly exposed in the engine compartment, and therefore, it is easy to check and change the expansion valve with a simple work. However, in this case, because a refrigerant pipe between the expansion valve in the engine compartment and an evaporator of an air conditioning unit in the passenger compartment is long, refrigerant absorbs heat in the engine compartment having a high temperature when refrigerant decompressed in the expansion valve flows through the long refrigerant pipe, thereby deteriorating a cooling performance of the air conditioning unit.

On the other hand, when the expansion valve is installed in the vehicle compartment, noise of refrigerant passing through the expansion valve is readily transmitted to a passenger in the passenger compartment, and therefore, the expansion valve is generally contained together with the evaporator in a case of the air conditioning unit to suppress the transmission of the noise. Thus, when the expansion valve is checked or changed, it is necessary to detach the air conditioning unit from a vehicle body and open the case of the air conditioning unit, thereby there is a problem in that the work for checking or changing the expansion valve is complicated.

In JP-Y2-7-37934 and JP-A-5-278455, an expansion valve is disposed in a dashboard separating the engine compartment and the passenger compartment. However, the expansion valve is disposed at the outside of the case of the air conditioning unit and is directly exposed in the passenger compartment. Therefore, when the air conditioning apparatus for a vehicle is practically used, the noise of refrigerant passing through the expansion valve may be transmitted to a passenger in the passenger compartment, and therefore it has an adverse influence on a quietness in the passenger compartment.

SUMMARY OF THE INVENTION

In view of the foregoing problems, it is an object of the present invention to provide an air conditioning apparatus for a vehicle, in which an expansion valve is disposed in a passenger compartment side to reduce the noise of refrigerant passing through the expansion valve while simplifying the work for checking and changing the expansion valve.

According to present invention, the expansion valve is installed in the passenger compartment at an outer side of an air conditioning unit and is so disposed that a case member of a diaphragm faces a front side of the vehicle and a valve body mechanism portion faces a rear side of the vehicle. Therefore, noise generated in the expansion valve is not directly transmitted to a passenger in the passenger compartment. Further, because a noise-absorbing member is attached on a dashboard at the passenger compartment side, noise transmitted from the case member of the expansion valve is mainly transmitted to the noise-absorbing member. In addition, the case member of the diaphragm is disposed near the noise absorbing member. Thus, the noise transmitted from the case member of the diaphragm is directly reached to the noise absorbing member without spreading the noise.

As a result, the noise transmitting from the case member of the diaphragm can be effectively reduced.

Further, the expansion valve is disposed at an outside of an air conditioning unit. Therefore, it is not necessary to remove the air conditioning unit from the vehicle or open the case of the air conditioning unit when the expansion valve is checked or exchanged, the expansion valve can be readily checked or exchanged, so that the expansion valve of the present invention has a simple operation performance. Because the expansion valve is installed in the passenger compartment, refrigerant decompressed and expanded in the expansion valve can be immediately introduced into the evaporator. Thus, heat-absorption of refrigerant in a passage between the expansion valve and the evaporator can be sufficiently suppressed, and the cooling performance decrease due to the heat-absorption of refrigerant can be sufficiently prevented.

BRIEF DESCRIPTION OF THE DRAWINGS

Additional objects and advantages of the present invention will be more readily apparent from the following detailed description of preferred embodiment when taken together with the accompanying drawings, in which.

DETAILED DESCRIPTION OF THE PRESENTLY PREFERRED EMBODIMENT

Preferred embodiment of the present invention will be described hereinafter with reference to the accompanying drawings.

Figure 1:
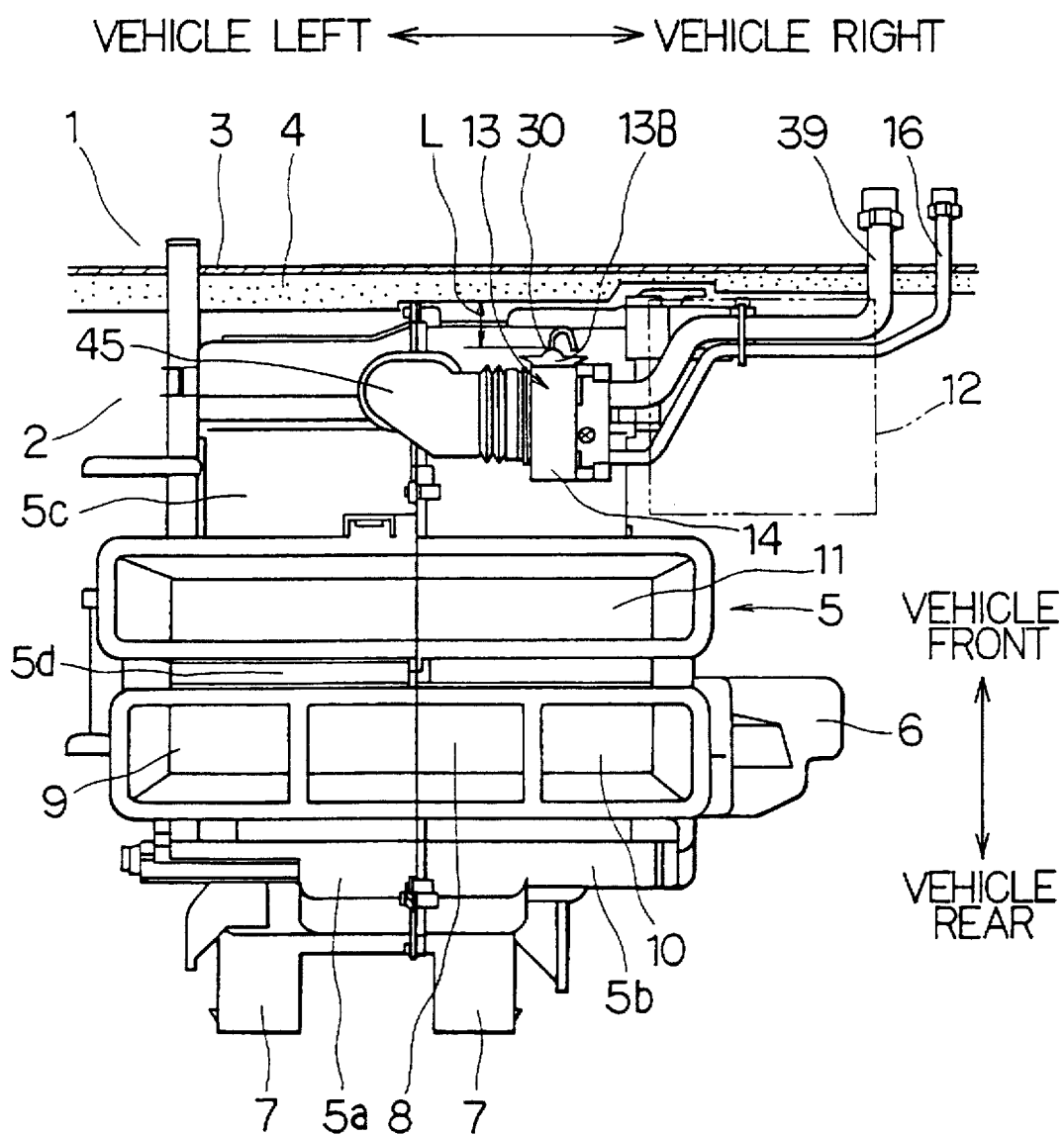
FIG. 1 is a partly sectional plan view showing an installation state of an air conditioning apparatus for a vehicle according to the first embodiment of the present invention.

As shown in FIG. 1, an air conditioning unit 5 of an air conditioning apparatus for a vehicle is disposed in a passenger compartment 2 of a vehicle having a left steering wheel. An engine compartment 1 and the passenger compartment 2 are separated by a dashboard 3 made of metal such as iron generally, a noise-absorbing member 4 is bonded on the entire inside surface of the passenger compartment 2.

The noise-absorbing member 4 has a double sheets structure, for example, a surface-protection sheet made of natural rubber, synthetic rubber, polyvinyl chloride or the like is bonded on a surface of a porous noise-absorbing sheet such as polyurethane foam. The noise-absorbing member 4 decreases the noise transmitting from the engine compartment 1 side to the passenger compartment 2 side, and increases a heat-insulating effect of the dashboard 3.

The air conditioning unit 5 is disposed at a lower side of an instrument panel (not shown) placed at the front portion of the passenger compartment to be adjacent to the dashboard 3. Further, the air conditioning unit 5 is disposed approximately at a center portion in the right-and-left direction in the passenger compartment. The air conditioning unit 5 has resinous cases 5a and 5b divided into two parts in the right-and-left direction in the passenger compartment, the two cases 5a and 5b are integrally connected with each other by a metallic spring clip, screws or the like to form an air passage.

The air conditioning unit 5 includes a cooler unit portion 5c disposed at a front side of a vehicle and a heater unit portion 5d disposed at a rear side of the cooler unit portion 5c in the vehicle. An evaporator 40 of a refrigerating cycle is disposed as a cooling heat exchanger within the cooling unit portion 5c (refer to FIG. 2). The evaporator 40 is disposed at an upstream air side of the air passage formed within the cases 5a and 5b.

A heater core 41 (refer to FIG. 2) of a hot-water circuit is disposed as a heating heat exchanger within the heater unit portion 5d. In the heater core 41, air is heated by an engine-cooling water (hot water). The heater core 41 is disposed at a downstream side of the evaporator 40 in air flow direction. Thus, air cooled in the evaporator 40 is re-heated in the heater core 41 up to a predetermined temperature to control a temperature of air to be blown into the passenger compartment.

A plurality of groups of air passages for leading air into the passenger compartment are formed at a downstream air side of the heater core 41 of the heater unit portion 5d, and are disposed at an upper side of the heater unit portion 5d.

Specifically, the plurality of groups of the air passages include: a front-seat foot air passage 6 connected to a front-seat foot outlet (not shown) for blowing out conditioned air toward the lower half body of a passenger seated on a front seat in the passenger compartment; a rear-seat foot air passage 7 connected to a rear-seat foot outlet (not shown) for blowing out the conditioned air toward the lower half body of a passenger seated on a rear seat in the passenger compartment; a center face air passage 8 connected to a center-side face outlet (not shown) for blowing out the conditioned air toward the upper half body of a passenger in the passenger compartment; left and right side face air passages 9 and 10; and a defroster air passage 11 connected to a defroster outlet (not shown) for blowing out the conditioned air toward an inner surface of the windshield.

A blower unit 12 is disposed at the right side in the passenger compartment (i.e., the passenger's seat side next to the driver's seat) relative to the cooler unit portion 5c of the air conditioning unit 5. The blower unit 12 is a well-known unit, the structure thereof is omitted in FIG. 1. The blower unit 12 includes an inside/outside air switching box for introducing inside air or outside air and a centrifugal-type blower for blowing the introduced inside air or outside air, and is arranged to blow air from an opening (not shown) opened at the right side of the cooler unit portion 5c to an upstream side of the evaporator 40 of the cooler unit portion 5c.

An expansion valve 13 is used as decompression means, and is a temperature-type expansion valve generally. To regulate refrigerant flow, the expansion valve 13 regulates the opening degree of the valve so that superheat degree of refrigerant at an outlet portion of the evaporator 40 of the cooler unit portion 5c is set to a predetermined value. As shown in FIG. 1, the expansion valve 13 is disposed on a case of the cooler unit portion 5c. That is, the expansion valve 13 is disposed at the outside of the air conditioning unit 5 near the noise-absorbing member 4 of the dashboard 3.

Next, the structure of the expansion valve 13 will be specifically described with reference to FIG. 2. A body case 14 of the expansion valve 13 is made of metal such as aluminum and is formed approximately in a rectangular parallelopiped shape. The up-and-down direction in FIG. 2 corresponds to the up-and-down direction in FIG. 1 showing a state where the expansion valve 13 is actually mounted on a vehicle. A refrigerant inlet 15 for flowing liquid refrigerant from a receiver 42 of the refrigerating cycle to the expansion valve 13 is formed at a lower-right side portion of the body case 14. The refrigerant inlet 15 is connected to the receive 42 within the engine compartment 1 through a high-pressure side refrigerant pipe 16.

The refrigerant inlet 15 communicates with a valve body chamber 17 formed at a lower center portion of the body case 14. Within the valve body chamber 17, a spherical valve body 18 of the expansion valve 13 and a supporting member 19 contacting and supporting the valve body 18 are contained. By the refrigerant inlet 15 and the valve body chamber 17, a liquid refrigerant passage of the expansion valve 13 is formed.

A restriction passage 20 for decompressing liquid refrigerant is formed at a refrigerant downstream side of the liquid refrigerant passage, the opening degree of the restriction passage 20 is regulated by the valve body 18. Further, a conical valve seat surface 20a is formed in the restriction passage 20 at a position facing the spherical valve body 18. In the embodiment, by the restriction passage 20 decompressing and expanding refrigerant and the valve body 18 regulating the opening degree of the restriction passage 20, a valve body mechanism portion 13A of the expansion valve 13 is constructed.

A valve rod 21 is disposed to penetrate through a center portion of the restriction passage 20, and the lower end portion of the valve rod 21 is integrated with the spherical valve body 18 by a welding method or the like. A refrigerant passage 22 in which gas-liquid two-phase refrigerant decompressed in the restriction passage 20 passes to have a low temperature and a low pressure is formed approximately at a center portion of the body case 14 in the up-and-down direction. The refrigerant passage 22 is connected with a refrigerant inlet portion of the evaporator 40 through a low-pressure side refrigerant pipe (i.e., evaporator inlet side pipe) 23.

Gas refrigerant evaporated in the evaporator 40 flows through an evaporator outlet side passage 24. The evaporator outlet side passage 24 is formed cylindrically to penetrate through the body case 14 in the left-and-right direction at the upper portion of the body case 14. The inlet end (i.e., left end in FIG. 2) of the evaporator outlet side passage 24 is connected to a refrigerant outlet portion of the evaporator 40 through a low pressure side refrigerant pipe (i.e., evaporator outlet side pipe) 24a. A temperature sensitive/ displacement transferring member 25 (hereinafter simply referred to as temperature sensitive member 25) is made of metal such as aluminum which is superior in heat conductivity and is formed in a cylindrical shape. The temperature sensitive member 25 is disposed to penetrate through the evaporator outlet side passage 24, and senses a temperature of superheat gas refrigerant evaporated in the evaporator 40. That is, the temperature sensitive member 25 is placed in the superheat gas refrigerant, and heat of the superheat gas refrigerant is transmitted to the temperature sensitive member 25 to detect the temperature of the superheat gas refrigerant.

Next, a temperature sensitive element portion 13B for actuating the valve body 18 of the expansion valve 13 will be described.

The top end of the valve rod 21 integrated with the valve body 18 contacts the bottom surface of the temperature sensitive member 25, an O-ring 26 for sealing is disposed on an outer periphery of a lower end portion of the temperature sensitive member 25, and the temperature sensitive member 25 is airtightly inserted in a hole portion 27 of the valve body case 14 and is formed slidably relative to the hole portion 27.

A circular contact portion 28 is formed integrally with the upper end portion of the temperature sensitive member 25, the contact portion 28 of the temperature sensitive member 25 contacts a diaphragm (i.e., pressure responding member) 29. Thus, when the diaphragm 29 is displaced in the up-and-down direction, the valve body 18 is also displaced in accordance with the displacement of the diaphragm 29 through the cylindrical temperature sensitive member 25 and the valve rod 21. In the embodiment, by the valve rod 21 and the temperature sensitive member 25, the displacement transferring member of the expansion valve 13 is constructed.

An outer periphery portion of the diaphragm 29 is held between upper and lower case members 30 and 31 to support the diaphragm 29 therebetween. The case members 30 and 31 are fixed at the top portion of the valve body case 14. Further, a space within the case members 30 and 31 is separated into an upper side chamber 32 and a lower side chamber 33 by the diaphragm 29.

In the upper side chamber 32, a capillary tube 34 for filling refrigerant is formed. Because the top end of the capillary tube 34 is closed, the upper side chamber 32 is a sealed space. Within the upper side chamber 32, the same type refrigerant gas with the refrigerant circulating in the refrigerating cycle is sealingly filled. A temperature of superheat gas refrigerant at the evaporator outlet is sensed in the temperature sensitive member 25 and is transmitted to the gas refrigerant sealed in the upper side chamber 32 through the diaphragm 29 made of metal, and the pressure of the gas refrigerant sealed in the upper side chamber 32 is set in accordance with the temperature of the superheat gas refrigerant at the evaporator outlet.

Thus, suitably, the diaphragm 29 is made of a rigid material having a sufficient elasticity and heat-transmitting performance, for example, a metal such as stainless steel (i.e., SUS304). The thickness of the diaphragm 29 is 0.13 mm, for example.

On the other hand, the lower side chamber 33 communicates with the evaporator outlet side passage 24 through a space around the contact portion 28 of the temperature sensitive member 25 and a communicating passage 35, refrigerant in the evaporator outlet side passage 24 is introduced into the lower side chamber 33. That is, the pressure of refrigerant in the lower side chamber 33 is similar to that in the evaporator outlet side passage 24.

The case members 30 and 31 are formed by a thin metal plate having a thickness in a range of 1.0–1.5 mm, for example, a stainless steel plate (i.e., SUS304).

In the lower end portion of the body case 14, a supporting mechanism of the valve body 18 is formed. Here, the supporting mechanism of the valve body 18 will be described. A screw hole 36 opened at an outside of the valve body case 14 is formed in the lower end portion of the valve body case 14, an adjustment nut 37 is screwed into the screw hole 36. An O-ring 37a for seal is attached around an outer peripheral portion of the adjustment nut 37, thereby a clearance between the adjustment nut 37 and the screw hole 36 can be airtightly sealed.

One end of a coil spring 38 (i.e., spring means) is supported by the adjustment nut 37, and another end of the coil spring 38 is supported by the supporting member 19 of the valve body 18. Thus, by adjusting the screwing position of the adjustment nut 3, a pre-set installation load of the coil spring 38 can be adjusted.

The downstream end (i.e., right end in FIG. 2) of the evaporator outlet side passage 24 in the body case 14 is connected to an intake of a compressor 43 in the engine compartment 1 through a low-pressure side refrigerant pipe 39. The compressor 43 is actuated by a vehicle engine to compress and discharge refrigerant. The discharged refrigerant gas is cooled and condensed in a condenser 44 in the engine compartment 1. The condensed refrigerant is separated into gas refrigerant and liquid refrigerant in the receiver 42, and the separated liquid refrigerant is received in the receiver 42.

As shown in FIG. 1, the expansion valve 13 is so disposed that the diaphragm 29 and the case members 30 and 31 of the temperature sensitive element portion 13B face the surface of the noise-absorbing member 4 of the dashboard 3 and the valve mechanism portion 13A faces a side opposite to the noise-absorbing member 4 (i.e., the valve mechanism portion 13A faces the rear side of the vehicle). The clearance L between the case member 30 of the temperature sensitive element portion 13B of the expansion valve 13 and the noise-absorbing member 4 of the dashboard 3 is set to have a small distance (e.g., 29 mm), so that the case member 30 of the expansion valve 13 is disposed near the noise-absorbing member 4.

The refrigerant pipes 23 and 24a connecting the expansion valve 13 to the evaporator 40 are covered with a resinous pipe cover 45 in FIG. 1 to perform heat-insulation and protect the refrigerant pipes 23 and 24.

Next, an operation of the embodiment having the above-described structure will be described.

When the compressor 1 is actuated and refrigerant circulates in the refrigerating cycle, the temperature of the superheat gas refrigerant passing the evaporator outlet side passage 24 is transferred to the sealed gas refrigerant in the upper side chamber 32 of the diaphragm 29 through the temperature sensitive member 25 and the diaphragm 29, and therefore, the pressure in the upper side chamber 42 is set to a pressure corresponding to the temperature of the superheat gas refrigerant in the evaporator outlet side passage 24. On the other hand, the pressure in the lower side chamber 33 of the diaphragm 29 is set to the pressure of refrigerant in the evaporator outlet side passage 24.

Thus, by the pressure difference between the upper side chamber 32 and the lower side chamber 33 and the installation load of the coil spring 38 pressing the valve body 18 to the upper side, the valve body 18 is displaced in the up and down direction. According to the displacement of the valve body 18, the opening degree of the restriction passage 20 is regulated so that the refrigerant flow of the expansion valve 13 is automatically regulated. By the regulation of the refrigerant flow, the superheat degree of gas refrigerant at the evaporator outlet is maintained at a predetermined degree. Here, the superheat degree of gas refrigerant at the evaporator outlet can be changed by changing the installation load of the coil spring 38.

When the high-pressure liquid refrigerant passes through the restriction passage 20 of the expansion valve 13, the high-pressure liquid refrigerant is rapidly decompressed to expand to gas-liquid two-phase refrigerant. The valve body 18 is influenced by the rapid decompressing and expanding operations of the refrigerant in the restriction passage 20 and repeats vibration. The vibration of the valve body 18 is transmitted to the metal diaphragm 29 through the valve rod 21 and the temperature sensitive member 25. In the embodiment, because the body case 14 has a thick wall as shown in FIG. 1, the body case 14 does not vibrate by the vibration of the valve body 18.

Further, because the vibration of the diaphragm 29 is transmitted to the thin metal case members 30 and 31 supporting the diaphragm 29, noise due to the vibration of the valve body 18 can be transmitted to the passenger compartment 2 through the thin metal case members 30 and 31.

However, according to the embodiment of the present invention, because the expansion valve 13 is so disposed that the diaphragm 29 and the case members 30 and 31 of the temperature sensitive element portion 13B of the expansion valve 13 face the side of the noise-absorbing member 4 and the valve body mechanism portion 13A faces the side opposite to the noise-absorbing member 4 of the dashboard 3, the noise transmitted from the metal case members 30 and 31 is mainly transmitted toward the noise-absorbing member 4. Further, because the case member 30 of the expansion valve 13 is disposed near the noise-absorbing member 4 to have the enough small clearance L therebetween, the noise transmitted from the metal case members 30 and 31 does not spread and directly reaches the noise-absorbing member 4 to absorb the noise.

As a result, by the absorbing operation of the noise-absorbing member 4, the noise transmitted from the metal case members 30 and 31 can be effectively reduced.

Figure 2:
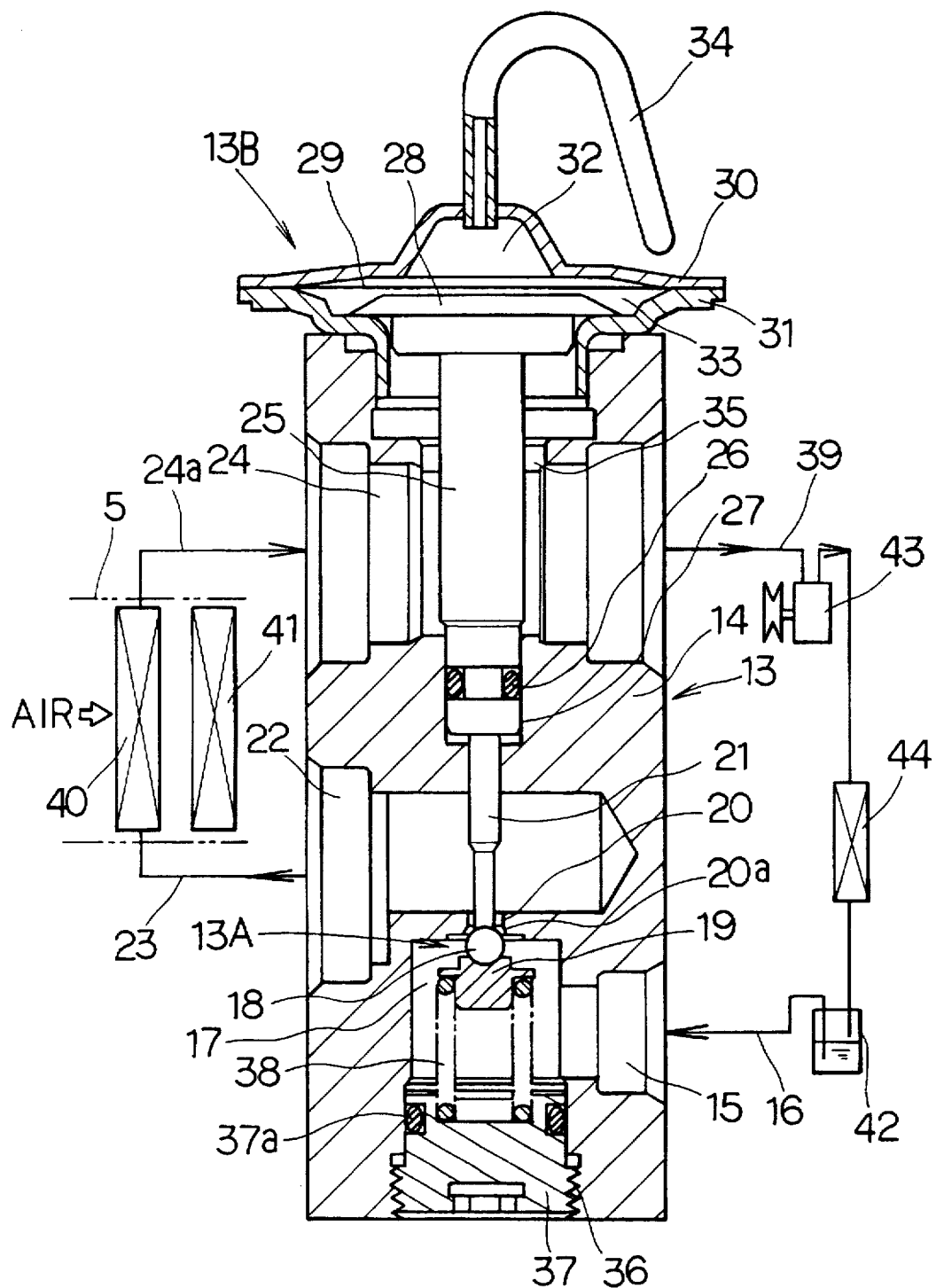
FIG. 2 is a longitudinal sectional view showing an expansion valve of the air conditioning apparatus shown in FIG. 1.

In the expansion valve 13 shown in FIG. 2, the evaporator outlet side passage 24 is formed within the body case 14 and the temperature sensitive member 25 is disposed to penetrate through the evaporator outlet side passage 24. However, the present invention can be applied in an expansion valve in which a temperature sensitive cylinder is disposed in the evaporator outlet side refrigerant pipe 24a and a pressure of refrigerant within the temperature sensitive cylinder is introduced into the upper side chamber 32 of the diaphragm 29 through a tube.

Further, in the above-described embodiment, the case members 30 and 31 of the diaphragm 29 of the temperature sensitive element portion 13B face the side of the noise-absorbing member 4 of the dashboard 3 and are disposed near the noise-absorbing member 4 so that the surface of the diaphragm 29 is in parallel with the noise-absorbing member 4. However, the surface of the diaphragm 29 may be slightly inclined relative to the noise-absorbing member 4.

The present invention having been described hereinabove should not be limited to the embodiment and the modifications but may be implemented in other ways without departing from the scope and spirit of the present invention.

What is claimed is:

1. An air conditioning apparatus for a vehicle having an engine compartment and a passenger compartment partitioned by a dashboard to which a noise-absorbing member is attached at a side of said passenger compartment, said air conditioning apparatus comprising:

an air conditioning unit including an evaporator having an inlet and an outlet for a refrigerating cycle; and an expansion valve disposed at a side of said inlet of said evaporator, said expansion valve comprising:

a valve body mechanism portion including a restriction passage for decompressing and expanding refrigerant and a valve body for regulating an opening degree of said restriction passage;

a temperature sensitive member for sensing a temperature of refrigerant in said outlet of said evaporator;

a diaphragm which is displaced in accordance with a temperature sensed by said temperature sensitive member to actuate said valve body; and a case member for supporting said diaphragm, wherein:

said expansion valve is installed in said passenger compartment at an outside of said air conditioning unit and is disposed proximate to said noise-absorbing member in such a manner that said case member of said diaphragm faces said noise-absorbing member and said valve body mechanism portion faces a side opposite to said noise-absorbing member.

2. An air conditioning apparatus according to claim 1, wherein:

said air conditioning unit includes an air conditioning case; and said expansion valve is disposed on an outer surface of said air conditioning case.

3. An air conditioning apparatus according to claim 1, wherein:

said temperature sensitive member is disposed to penetrate through a refrigerant pipe at a side of said outlet of said evaporator.

4. An air conditioning apparatus according to claim 1, wherein:

said noise-absorbing member has a double sheet structure; and said double sheet structure includes a porous noise-absorbing sheet and a surface-protection sheet bonded on said porous noise-absorbing sheet.

5. An air conditioning apparatus according to claim 1, further comprising:

a housing having a thick wall for containing said expansion valve.

6. An air conditioning apparatus according to claim 5, wherein:

said case member is fixed at a top portion of said housing and includes an upper side case member and a lower side case member;

said diaphragm is held between said upper side case member and said lower side case member; and said upper side case member is disposed to face said noise-absorbing member.

7. An air conditioning apparatus according to claim 6, wherein:

each of said upper side case member and said lower side case member is formed by a thin metal plate; and each thickness of said upper side case member and lower side case member is in a range of 1.0–1.5 mm.

8. An air conditioning apparatus according to claim 6, wherein:

said diaphragm held between said upper side case member and said lower side case member is disposed to be in parallel with said noise-absorbing member.

9. An air conditioning apparatus for a vehicle having an engine compartment and a passenger compartment partitioned from each other, said vehicle including a noise absorbing member, said air conditioning apparatus comprising:

an air conditioning unit including an evaporator having an inlet and an outlet for a refrigerating cycle; and an expansion valve disposed at a side of said inlet of said evaporator, said expansion valve comprising:

a valve body mechanism portion including a restriction passage for decompressing and expanding refrigerant and a valve body for regulating an opening degree of said restriction passage;

a temperature sensitive member for sensing a temperature of refrigerant in said outlet of said evaporator;

a diaphragm which is displaced in accordance with a temperature sensed by said temperature sensitive member to actuate said valve body; and a case member for supporting said diaphragm, said noise absorbing member being disposed proximate to said case member of said diaphragm to face said case member;

wherein said expansion valve is installed in said passenger compartment at an outside of said air conditioning unit in such a manner that said case member of said diaphragm faces a front side of said vehicle and said valve body mechanism portion faces a rear side of said vehicle.

10. An air conditioning apparatus according to claim 9, wherein:

said air conditioning unit includes an air conditioning case; and said expansion valve is disposed on an outer surface of said air conditioning case.

* * * * *